US011530673B2

(12) United States Patent
King et al.

(10) Patent No.: US 11,530,673 B2
(45) Date of Patent: *Dec. 20, 2022

(54) METHOD AND SYSTEM FOR ACTIVATING IN-VEHICLE POWER SOURCE

(71) Applicant: FORD GLOBAL TECHNOLOGIES, LLC, Dearborn, MI (US)

(72) Inventors: Daniel M. King, Northville, MI (US); Michael Hrecznyj, Livonia, MI (US); John Robert Van Wiemeersch, Novi, MI (US); Timothy Thivierge, Jr., Carleton, MI (US); Zeljko Deljevic, Plymouth, MI (US); Jason Myslinski, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,875

(22) Filed: Jan. 8, 2021

(65) Prior Publication Data

US 2021/0123407 A1 Apr. 29, 2021

Related U.S. Application Data

(63) Continuation of application No. 15/793,534, filed on Oct. 25, 2017, now Pat. No. 10,895,235.

(51) Int. Cl.
*F02N 11/08* (2006.01)
*B60K 28/04* (2006.01)
(Continued)

(52) U.S. Cl.
CPC .......... *F02N 11/0807* (2013.01); *B60K 28/04* (2013.01); *F02N 11/0818* (2013.01); *H04W 4/02* (2013.01); *H02J 7/00* (2013.01)

(58) Field of Classification Search
CPC ............ F02N 11/0807; F02N 11/0818; F02N 2200/061; F02N 11/0803; F02N 11/101;
(Continued)

(56) References Cited

U.S. PATENT DOCUMENTS 6,789,519 B1 9/2004 Bell
2007/0262642 A1 11/2007 Brown, Jr. et al.
(Continued)

FOREIGN PATENT DOCUMENTS

GB 2496847 A 5/2013
JP 2005186636 A * 7/2005
WO 2001023695 A1 4/2001

OTHER PUBLICATIONS

English Translation JP2005186636A.*
Goreham, "Dead Key Fob?" (n.d.) Retrieved from http://bestride.com/news/technology/how-to=unlock-and-start-your-car-when-the-keygob-is-dead.

*Primary Examiner* — Rami Khatib
(74) *Attorney, Agent, or Firm* — Joseph M. Zane; Brooks Kushman P.C.

(57) ABSTRACT

A system for a vehicle includes an input device configured to send an activation signal responsive to an input to start the vehicle. The system further includes a vehicle body controller, programmed to, responsive to the input and a lack of presence of a phone operating as a key, send an activation signal to activate a power source within a cabin of the vehicle for up to a predefined time period since a last vehicle start.

24 Claims, 3 Drawing Sheets

(51) Int. Cl.
*H04W 4/02* (2018.01)
*H02J 7/00* (2006.01)

(58) Field of Classification Search
CPC .. B60K 28/04; H04W 4/02; H02J 7/00; B60R 16/03; B60R 25/24
See application file for complete search history.

(56) References Cited

U.S. PATENT DOCUMENTS

| | | |
|---|---|---|
| 2009/0102434 A1 | 4/2009 | Nakajima et al. |
| 2014/0163777 A1 | 6/2014 | Yashiro et al. |
| 2014/0253030 A1 | 9/2014 | Moon |
| 2016/0368455 A1* | 12/2016 | Kim .................. B60R 25/23 |
| 2017/0063104 A1 | 3/2017 | Bean |
| 2017/0253216 A1 | 9/2017 | Nishidai et al. |
| 2019/0111907 A1 | 4/2019 | Harata et al. |

\* cited by examiner

METHOD AND SYSTEM FOR ACTIVATING IN-VEHICLE POWER SOURCE

CROSS-REFERENCE TO RELATED APPLICATIONS

This application is a continuation of U.S. application Ser. No. 15/793,534 filed Oct. 25, 2017, now allowed, the disclosure of which is hereby incorporated in its entirety by reference herein.

TECHNICAL FIELD

The present disclosure generally relates to a method and system for controlling activation of a power source within a vehicle cabin while the vehicle is in an off state.

BACKGROUND

With the development of wireless technology, mobile devices such as mobile phones may be used to replace traditional keys to unlock and start a vehicle. An owner of a vehicle may install applications and electronic or virtual keys for the vehicle on his/her mobile phone, and pair the mobile phone with the vehicle computer system. When the phone is within proximity to the vehicle, the phone connects to the vehicle's computer system via a wireless connection such as a BLUETOOTH, BLUETOOTH Low Energy (BLE), NFC, or other suitable phone-resident protocols, and the computer system verifies the paired encryption key stored in vehicle with the encryption key stored in the mobile device via the application. Upon a successful verification, the computer system may allow the owner to unlock and/or authorize the vehicle to accept a start command.

SUMMARY

In one or more illustrative embodiments, a system for a vehicle includes an input device configured to send an activation signal responsive to an input to start the vehicle. The system further includes a vehicle body controller, programmed to, responsive to the input and a lack of presence of a phone operating as a key, the presence of a passive Key Fob, NFC Card, or the entry of a keypad ignition code, to send an activation signal to activate a power source within a cabin of the vehicle for up to a predefined time period since a last vehicle start.

In one or more illustrative embodiments, a method includes receiving an input to start a vehicle configured to start with presence of a mobile device operating as a key but without detecting presence of the mobile device, the presence of a passive Key Fob, NFC Card, or the entry of a keypad ignition code; sending an activation signal via an in-vehicle network responsive to the input to start the vehicle; and activating a power source for up to a predefined period.

In one or more illustrative embodiments, a system includes a processor programmed to, responsive to receiving an input to start a vehicle without detecting presence of a mobile device operating as a key, the presence of a passive Key Fob, NFC Card, or the entry of a keypad ignition code, the vehicle identified according to a storage as being configured to start with presence of the mobile device, send an activation signal to activate a power source within a cabin of the vehicle for up to a predefined time period since a last vehicle start.

The details of one or more implementations are set forth in the accompanying drawings and the description below. Other features and advantages will become apparent from the description, the drawings, and the claims.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The FIGS. are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

Vehicles equipped with passive entry passive start systems use wireless detection of a key fob to unlock and authorize start of the vehicle. In some implementation, a mobile device such as a cellphone may be used in place of the key fob to unlock and start the vehicle. However, if the battery of the mobile device is depleted, a user may be unable to start the vehicle because the vehicle does not detect a valid key. In addition, the user cannot activate any power ports (such as a USB port) within the vehicle cabin to recharge the battery because the vehicle computer system will not switch to accessory mode without a key. In this case, the driver may be stranded while holding a valid key stored to the mobile device. The present disclosure, among other things, proposes vehicular systems and methods for activating a power source in a vehicle when the vehicle is turned off. This may be done to allow the battery of the mobile device to be re-charged, thereby allowing the vehicle to be started.

Figure 1:
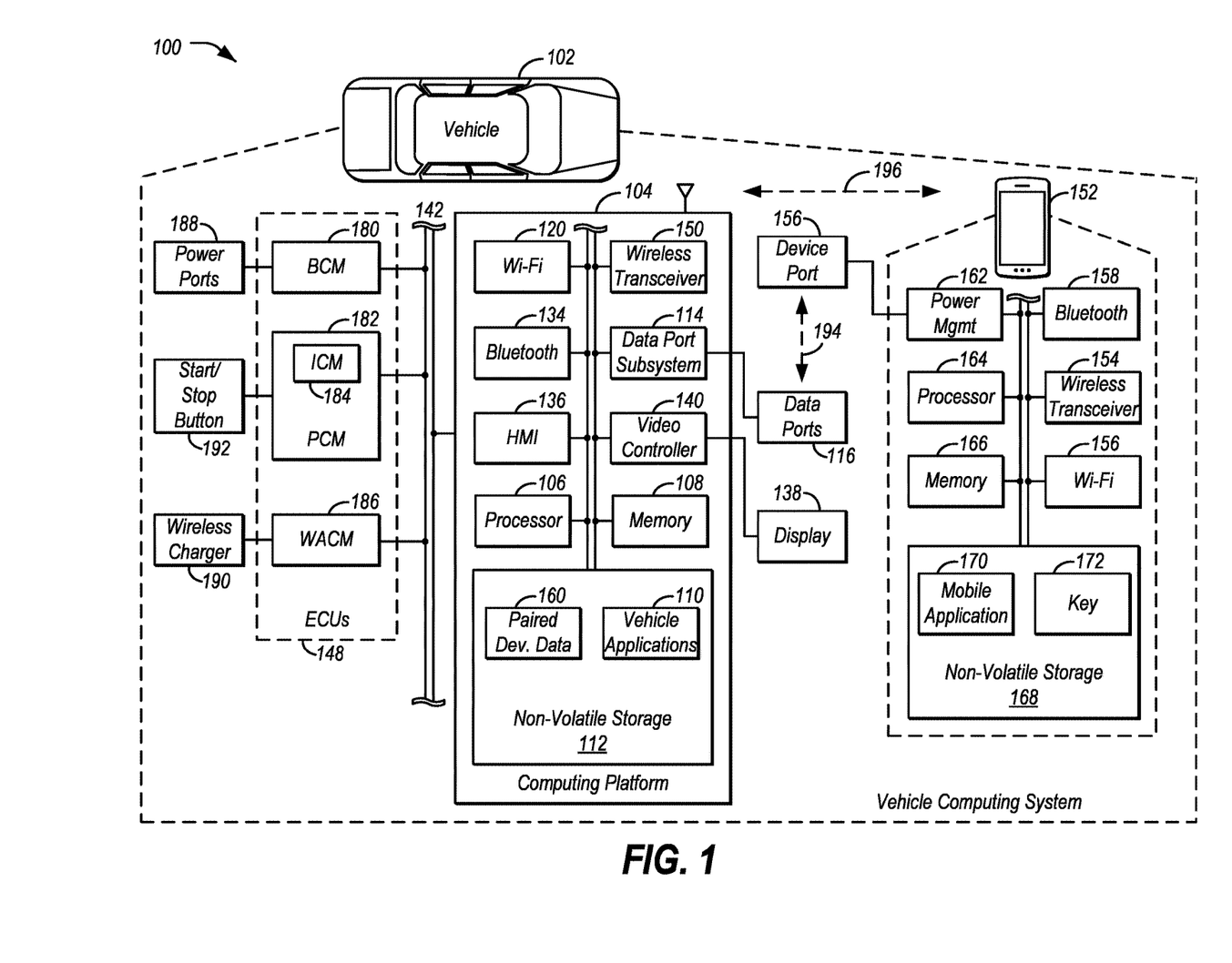
FIG. 1 illustrates an example block topology of a vehicle system of one embodiment of the present disclosure.

FIG. 1 illustrates an example diagram of a system 100 that may be used to activate power sources within the vehicle 102. The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. It should be noted that the illustrated system 100 is merely an example, and more, fewer, and/or differently located elements may be used.

A computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage media 112. The computer-readable medium 112 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be configured to receive input from human-machine interface (HMI) controls 136 configured to provide for occupant interaction with the vehicle 102. For instance, the computing platform 104 may interface with one or more buttons (not shown) or other HMI controls configured to invoke functions on the computing platform 104 (e.g., a numeric or other keypad, steering wheel audio buttons, a push-to-talk button, instrument panel controls, etc.). The computing platform 104 may drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be configured to communicate with a mobile device 152 of the vehicle occupants. The mobile device 152 may be any of various types of portable computing device, such as cellular phones, tablet computers, smart watches, laptop computers, portable music players, or other devise capable of communication with the computing platform 104. In many examples, the computing platform 104 may include a wireless transceiver 150 (e.g., a BLUETOOTH module, a Zigbee transceiver, a Wi-Fi transceiver, an IrDA transceiver, an RFID transceiver, etc.) configured to communicate with a compatible wireless transceiver 154 of the mobile device 152. The wireless modules may transmit data at a carrier frequency or a center frequency. The center frequency is an important aspect of a wireless system by impacting noise immunity and bandwidth. For example, typical remote keyless entry systems operate at 902 MHz in the United States, and 868 MHz in Europe, while Wi-Fi and BLUETOOTH may operate at frequencies including frequencies over 2 GHz.

The computing platform 104 may also be configured to communicate with the mobile device 152 over a wired connection 194 through one or more data ports 116 controlled by the data port subsystem 114. In an example, the wired connection 194 may be created via a cable connected between one of the data ports 116 and a device port 156 of the mobile device 152. When connected, the data ports 116 may be configured to transfer data to and from the mobile device 152. The data ports 116 may also be configured to supply power to the mobile device 152 via the cable connection 194 to the device port 156. The mobile device 152 may be configured to manage the device port 156 by a power management controller 162. The device port 156 may be any port that supports a power and/or data transaction protocol supported by the data ports 116 of the vehicle 102. In some examples, the data ports 116 and the device port 156 of the mobile device 152 may be any of USB type-A, USB type-B, USB mini, USB micro, and/or USB type C ports. In another example, the device port 156 may be a Lightning® port.

The computing platform 104 may be further configured to communicate with other components of the vehicle 102 via an in-vehicle networks 142. The in-vehicle network 142 may include, but not limited to, one or more of a CAN, an Ethernet network, and a MOST, as some examples. The in-vehicle network 142 may allow the computing platform 104 to communicate with other vehicle systems, such as one or more electronic control units (ECUs) 148. The ECUs 148 may include, but not limited to, a body control module (BCM) 180, a powertrain control module (PCM) 182 which may by equipped with an immobilizer control module (ICM) 184, and a wireless accessory control module (WACM) 186.

The BCM 180 may be configured to connect to the computing platform 104 via the in-vehicle network 142 and monitor and control various electronic accessories in the body of vehicle 102. As an example, the BCM 180 may be configured to control the central locking, power windows, power mirrors, and power ports 188 of the vehicle 102. The power ports 188 may include, for example, a 12 Volt cigarette lighter socket or a USB port. Regardless of the port type, the power port 188 may be configured to supply power to the mobile device 152 through the device port 156 directly or through use of a power adaptor.

The PCM 182 may be configured to connect to the computing platform 104 via the in-vehicle network 142. The PCM 182 may monitor and control the operation of the engine and transmission, including the ON/OFF or accessory (ACC) status of the vehicle 102. In the ON status, the vehicle may be in a ready or a motive mode, and accessory functions such as the radio may be available. In the OFF status, the vehicle 102 motive capabilities may be disengaged and inaccessible without credentials. In the ACC status, accessories of the vehicle 102 may be available, but vehicle 102 motive capabilities may be disengaged and inaccessible. The ICM 184 may be integrated onto the PCM 182 configured to verifying valid vehicle keys so as to allow the vehicle to be moved from the OFF status to the ON or ACC status. As an example, the ICM 184 may be configured to only allow the engine fuel injection system to activate upon the detection of a valid key inside the vehicle 102. Alternatively, the ICM 184 may be a separate component from the PCM 182 that is connected to the in-vehicle network 142 and configured to control the starting of the vehicle 102. Or, the ICM 184 may be integrated with the BCM 180.

The PCM 182 may be further configured to control the ON or OFF status of the vehicle responsive to an input from a vehicle start/stop button 192 connected thereto. Alternatively, the start/stop button 192 may be connected to the BCM 180 and configured to communicate with the PCM 182 through the in-vehicle network 142.

A mobile device 152 storing a valid key 172 for the vehicle 102 may have been previously been paired with the computing platform 104 of the vehicle 102. The computing platform 104 stores the pairing information in the paired device data in the storage 112. When a driver enters the vehicle 102, the mobile device 152 may be recognized by the computing platform 104 using the paired device data 160. The mobile device 152 may automatically connect to the computing platform 104 via a wireless connection 196. The wireless connection may be, but not limited to, a BLUETOOTH connection controlled by a BLUETOOTH module 134 and/or a WiFi connection controlled by an WiFi module 120. Alternatively or additionally, the paired device data 160 may be stored in the BLUETOOTH module 134 and/or WiFi module 120. The mobile device 152 may launch the mobile application 170 stored in the storage 168 and send the key 172 to the computing platform 104 via the wireless connection 196. The computing platform 104 may transfer the key 172 to the ICM 184 via the in-vehicle network 142 for processing. If the ICM 184 recognize the key 172 to be valid, it may generate a vehicle activation signal for the PCM 182 to permit the vehicle 102 to start. When the driver pushes the start/stop button 192 to start the vehicle 102, the PCM 182 having received the vehicle activation signal from the ICM 184 may start the vehicle 102. If, however, the ICM 184 does not receive any valid key 172, it is not going to generate the vehicle activation signal, without which the PCM 182 will be unable to start the vehicle 102. As an example, the key 172 may be an encrypted code.

The WACM 186 may be configured to connect to the computing platform 104 via the in-vehicle network 142. The WACM 186 may control a wireless charger 190. The wireless charger 190 may allow for wireless charging of the mobile device 152. When the vehicle 102 is in ACC or ON/RUN mode, an occupant (such as the driver) of the vehicle 102 may turn on the wireless charger 190 using the HMI controls 136. If so, the computing platform 104 sends a power source activation signal to the WACM 186 via the in-vehicle network 142. The WACM 186 may in turn switch on the wireless charger 190 responsive to the power source activation signal. This allows the occupant to use the wireless charger 190 to charge the mobile device 152 wirelessly, without physically connecting it to the computing platform 104 through the device port 156.

Figure 2:
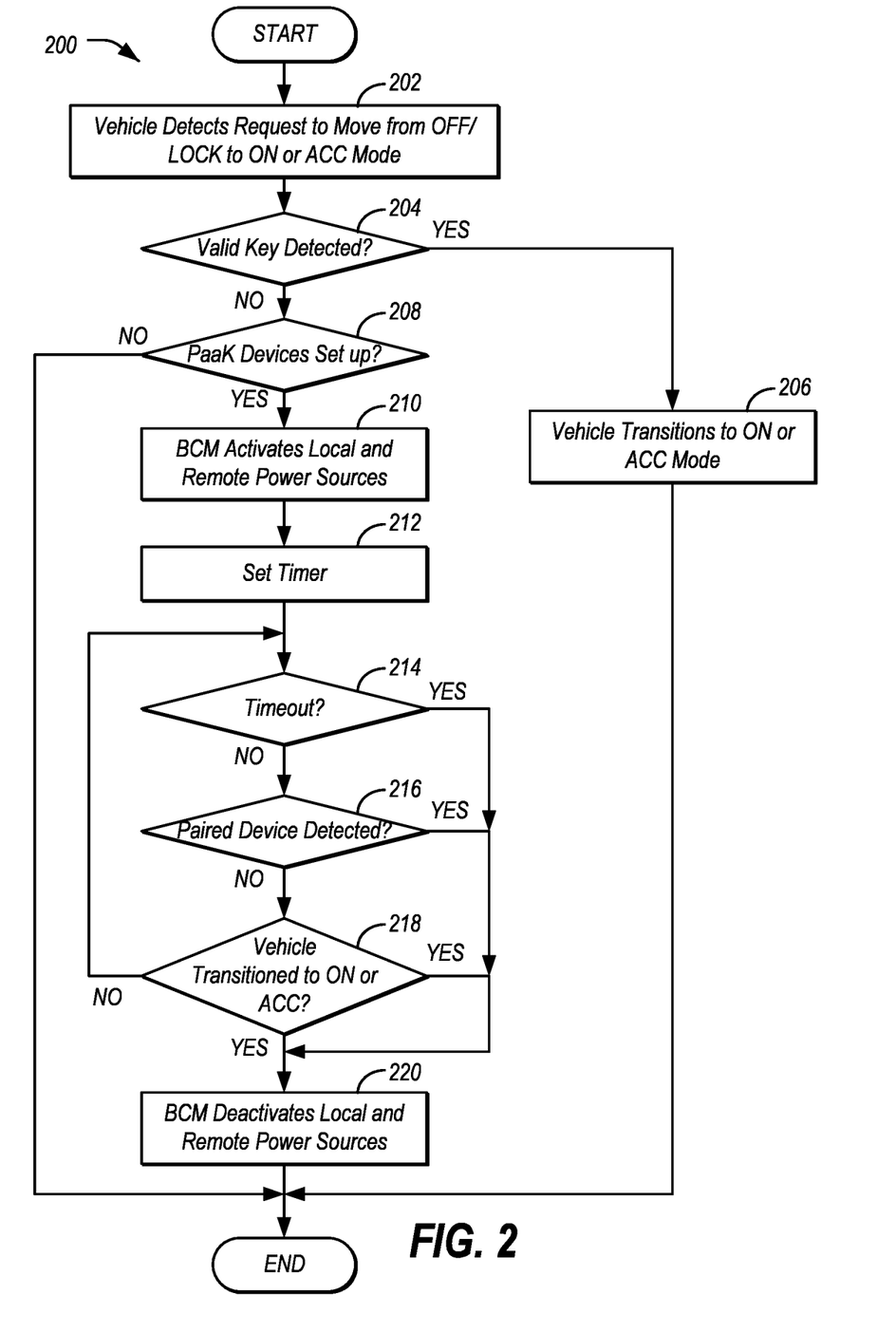
FIG. 2 illustrates an example flow diagram of the process for activating power sources of one embodiment of the present disclosure.

FIG. 2 illustrates an example flow diagram of a process 200 for activating power sources for vehicle 102. At operation 202, the vehicle 102 detects a request to move the vehicle 102 from the OFF/LOCK mode to the ON or ACC mode. In an example, the user may press a vehicle start/stop button 192, which may provide a push button signal to the PCM 182. In another example, in the case of a BEV or PHEV vehicle 102, the user may plug the vehicle 102 in for charging.

At operation 204, responsive to the request, the PCM 182 determines whether there is a vehicle activation signal from the ICM 184. If a valid key 172 is detected, and the ICM 184 generates the vehicle activation signal for the PCM 182, the process moves to operation 206, at which the vehicle 102 is transitioned to the ON or ACC mode. The valid key 172 may be a key stored to a vehicle 102, or a passive Key Fob, NFC Card, or even the entry of a keypad ignition code. If, however, the computing platform 104 does not detect a valid key 172 in the vehicle 102, the ICM 184 prevents the vehicle from starting and the process moves to operation 208.

At operation 208, the BCM 180 determine whether any mobile devices 152 are assigned to the vehicle 102 for use as keys. In one possibility, the BCM 180 may query a BLUETOOTH Low Energy module (BLEM) in communication with the BCM 180 to identify whether any mobile devices 152 have been assigned to the vehicle 102 for use as keys. If a mobile device 152 has been assigned to the vehicle 102 as being a possibility for transitioning the vehicle to ACC or ON, but is not present, control passes to operation 210. If not, the process 200 ends.

At operation 210, the BCM 180 of vehicle 102 activates local and remote power sources. In an example, the BCM 180 may activate the power ports 188 of the BCM 180. The BCM 180 may further send out a power source activation signal to the in-vehicle network 142. Responsive to the power source activation signal, various other power sources within the vehicle 102 cabin may be turned on. In an example, the USB subsystem 114 of the computing platform 104 may receive the power source activation signal over the in-vehicle network 142, and may activate the USB ports 116. In another example, the WACM 186 may receive the power source activation signal over the in-vehicle network 142, and may activate the wireless charger 190. It is noted that other modules may also respond to the power source activation signal to turn on power sources.

At operation 212, the vehicle 102 sets a timer to a time period for powering the power sources. The timer can be implemented in various ways. In an example, the computing platform 104 may be configured to implement the timer. As an alternative example, the BCM 180 may be configured to implement the timer. The timer may be set to a length of time to charge the battery of the mobile device 152, thereby allowing the mobile device 152 to turn on and connect to the computing platform 104 and launch key 172, so as to allow the ICM 184 to detect the key 172. In some examples, when the mobile device 152 is connected to the computing platform 104 via the wired connection 194 through the USB ports 116, the key 172 may be sent to the computing platform 104 through the wired connection 194 directly without going through the wireless connection 196. It is noted that, the length of time of the timer does not need to be sufficient to fully charge the mobile device 152. The mobile device 152 only needs enough charge to switch on to send the key 172.

In one example, a fifteen minutes predefined time period may be used. However it should be noted that in some examples the power budget of fifteen minutes lasts for the entire key off cycle. For instance, if the power source is used for five minutes during a key off cycle and is turned off by the user, a subsequent time period used during the same key off cycle may only be up to a maximum of ten minutes.

At operation 214, the vehicle 102 identifies whether the predefined time period has elapsed. Responsive to the timer having elapsed, control passes to operation 220 to deactivate local and remote power sources. If not, control passes to operation 214 to optionally determine whether any previously-paired mobile devices 152 can now be detected. For instance, once a mobile device 152 is charged sufficiently enough to connect to the vehicle 102, charging is no longer needed, so the power sources may be turned off to conserve vehicle battery power. If previously-paired mobile devices 152 are detected, control passes to operation 218. If not, control passes to operation 218 to optionally determine whether the vehicle 102 has been transitioned to ON or ACC mode. For instance, another key device may have been brought into the vehicle 102 during the charging of a mobile device 152, in such case that the charging is no longer required.

At operation 220, the BCM 180 deactivates both local and remote power sources. In an example, the BCM 180 generates a power source deactivation signal and sends the power source deactivation signal through the in-vehicle network 142. Alternatively, the power source deactivation signal may be generated and sent by the computing platform 104. In an example, the USB subsystem 114 of the computing platform 104 may receive the power source deactivation signal over the in-vehicle network 142, and may deactivate the USB ports 116. In another example, the WACM 186 may receive the power source deactivation signal over the in-vehicle network 142, and may deactivate the wireless charger 190. The process ends after operation 220.

Figure 3:
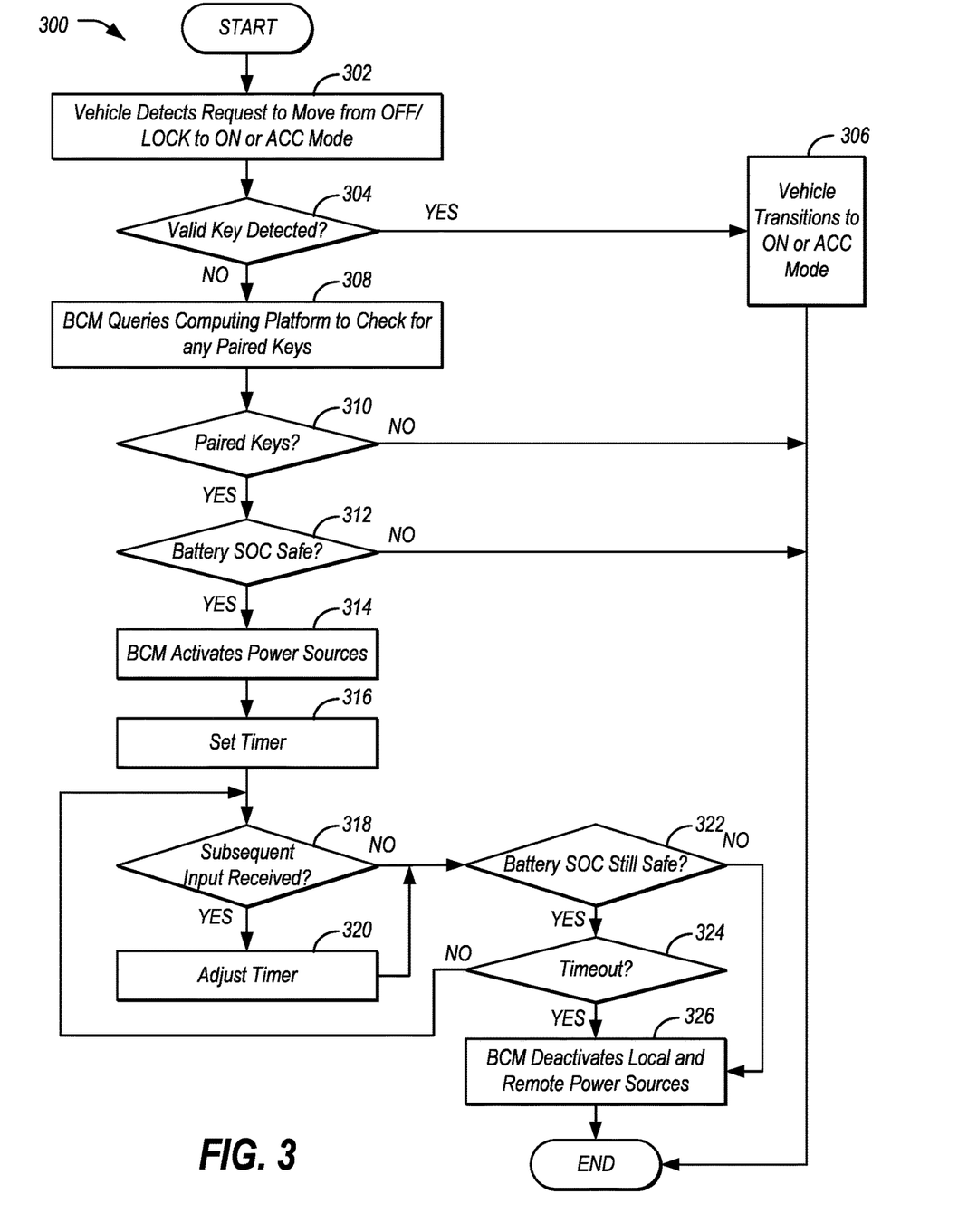
FIG. 3 illustrates an example flow diagram of the process for activating power sources of another embodiment of the present disclosure.

FIG. 3 illustrates an alternative example flow diagram of a process 300 for activating power sources for vehicle 102. As compared to the process 200, in the process 300 the computing platform 104 monitors the state of charge of the battery of the vehicle 102. Based on the state of charge of the vehicle 102 battery, the occupant may be provided an option to extend the timer to continue to provide power to the power sources.

At operation 302, the vehicle 102 detects a request to move the vehicle 102 from the OFF/LOCK mode to the ON or ACC mode. In an example, the user may press a vehicle start/stop button 192 of the vehicle 102, which may provide a push button signal to the PCM 182.

At operation 304, responsive to the request to move to the ON or ACC mode, the PCM 182 determines whether there is a vehicle activation signal from the ICM 184. If a valid key 172 is detected by the computing platform 104, and the ICM 184 generates the vehicle activation signal for the PCM 182, the process moves to operation 306, at which the vehicle 102 is transitioned to the ON or ACC mode. If, however, the computing platform 104 does not detect a valid key 172 in the vehicle 102, the ICM 184 prevents the vehicle from starting and the process moves to operation 308.

At operation 308, the BCM 180 queries the computing platform 104 to identify whether a mobile device 152 with the key 172 is paired to the computing platform 104 of the vehicle 102. In an example, the pairing information of the mobile device 152 may be stored in the BLUETOOTH module 134 if the mobile device 152 is previously paired to the computing platform 104 via a BLUETOOTH connection. Additionally or alternatively, the pairing information may be stored in the WiFi module 120 and/or the storage 112.

At operation 310, the BCM 180 determines whether there is any mobile device 152 that is previously paired to the computing platform 104. The BCM 180 may allow the activation of the power sources only if there is at least one previously-paired mobile device 152 potentially having a key 172 configured to start the vehicle 102. In other words, power sources may be activated only if there is a possibility that charging a mobile device 152 may help to start the vehicle 102. If the BCM 180 determines that the computing platform 104 has information relating to a mobile device 152 being used as a key, control passes to operation 312. If, however, no mobile device 152 was ever used as a key, charging of mobile devices 152 would not aid in starting the vehicle 102. Thus, if the BCM 180 determines there are no such mobile devices 152 that have been paired, no power sources are activated and the process 300 ends.

At operation 312 the BCM 180 determines whether the state of charge (SOC) of the battery of the vehicle 102 is sufficient to supply power to the power sources. In an example, a threshold SOC may be set to allow for the vehicle 102 to have power to perform one or more engine starts. The BCM 180 may determine the SOC according to the voltage of the battery when removed from any loads. If it is determined that the SOC of the battery is lower than a threshold such that the power sources may deplete the vehicle 102 below an SOC threshold, the process 300 ends without activating any power sources. If the BCM 180 determines that the SOC of the battery is above the threshold, control passes to operation 314.

At operation 314, the BCM 180 of vehicle 102 activates local and remote power sources. In an example, the BCM 180 may activate the power ports 188 of the BCM 180. The BCM 180 may further send out a power source activation signal to the in-vehicle network 142. Responsive to the power source activation signal, various other power sources within the vehicle 102 cabin may be turned on. In an example, the USB subsystem 114 of the computing platform 104 may receive the power source activation signal over the in-vehicle network 142, and may activate the USB ports 116. In another example, the WACM 186 may receive the power source activation signal over the in-vehicle network 142, and may activate the wireless charger 190. It is noted that other modules may also respond to the power source activation signal to turn on power sources.

At operation 316, a timer for a predefined time period is set to start. The timer can be implemented in various ways. In an example, the computing platform 104 may be configured to implement the timer. As an alternative example, the BCM 180 may be configured to implement the timer. The timer may be set to a length of time to charge the battery of the mobile device 152, thereby allowing the mobile device 152 to turn on and connect to the computing platform 104 and launch key 172, so as to allow the ICM 184 to detect the key 172. In some examples, when the mobile device 152 is connected to the computing platform 104 via the wired connection 194 through the USB ports 116, the key 172 may be sent to the computing platform 104 through the wired connection 194 directly without going through the wireless connection 196. It is noted that, the length of time of the timer does not need to be sufficient to fully charge the mobile device 152. The mobile device 152 only needs enough charge to switch on to send the key 172. In one example, a fifteen minutes predefined time period may be used.

At operation 318, the BCM 180 determines whether a subsequent input to extend the power source power time is received. In an example, when the battery of the mobile device 152 is deeply discharged, the mobile device 152 may require more than fifteen minutes to be brought back to operation. If so, the BCM 180 may allow the user to extend the length of time for powering of the power sources responsive to receiving a subsequent input. In an example, the driver may push the start/stop button 192 again to extend the timer. (It should be noted that in other examples, this may not be allowed, and subsequent pushes may not allow the system to exceed the overall power budget time.) Additionally or alternatively, the driver may make the subsequent input through the HMI controller 136 (e.g., via pressing an extend button in a HMI screen). If such input is received, control passes to operation 320, at which the timer is adjusted. In an example, the timer may be configured to extend by a predefined interval, such as by five minutes with each subsequent input. Alternatively, the timer may be configured to reset to a predefined time period with each subsequent input, e.g., to extend back to the full timer timeout period. As an example, the BCM 180 may only allow the driver to adjust the timer near the end of the current timer. For instance, a subsequent input on the start/stop button will not increase the timer until it reaches its final minute of countdown. (It should also be noted that in some examples, the power time and increment time may be settable to the vehicle 102 responsive to a settings update received via various mechanisms, such as via the mobile device 152, via WiFi, or via a connection to a remote server using an embedded modem of the vehicle 102.)

If at operation 318 no subsequent input is received, control passes to operation 322. At operation 322, the BCM 180 determines whether the SOC of the vehicle battery is still sufficient to continue to supply power to the mobile device 152. In an example, the BCM 180 may compare the SOC to a second predefined threshold. It is noted that the second threshold may or may not be the same as the first threshold at operation 312. If the BCM 180 determines that the SOC of the battery is still sufficient to keep the power sources activated, control passes to operation 324. If not, control passes to operation 326. At operation 324, the vehicle 102 identifies whether the predefined time period has elapsed. (Additionally, checks for previously-paired mobile devices 152 and/or whether the vehicle 102 has been transitioned to ON or ACC mode may optionally be performed, as discussed above with respect to the process 200.) Responsive to the timer elapsing (or location of previously-paired mobile devices 152 or transition of the vehicle 102 to transitioned to ON or ACC mode), control passes to operation 326.

At operation 326, the BCM 180 deactivates all power supplies that it has previously turned on. In an example, the BCM 180 generates a power source deactivation signal and sends the power source deactivation signal through the in-network 142. Alternatively, the power source deactivation signal may be generated and sent by the computing platform 104. In an example, the USB subsystem 114 of the computing platform 104 may receive the power source deactivation signal over the in-vehicle network 142, and may deactivate the USB ports 116. In another example, the WACM 186 may receive the power source deactivation signal over the in-vehicle network 142, and may deactivate the wireless charger 190. The process ends at operation 328.

Variations on the systems and methods are possible. For instance, the aforementioned charging functionality may be disabled for vehicles 102 that are in a plant or factory mode, e.g., during assembly or transport to a dealer, or on a dealer lot before being sold.

Computing devices described herein, such as the computing platform 104, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A system for a vehicle comprising:
an input device configured to send a vehicle activation signal responsive to an input to transition the vehicle to an on or accessory mode; and
a vehicle body controller, programmed to, responsive to the input and a lack of presence of a valid key:
identify whether the vehicle is paired with at least one mobile device that is not detected as being present, the at least one mobile device storing a key for transitioning the vehicle to the on or accessory mode, and
if so, activate a power source within a cabin of the vehicle for up to a predefined time period since a last vehicle start, the power source configured to charge the at least one mobile device.

2. The system of claim 1, wherein the vehicle body controller is further programmed to receive the predefined time period from the at least one mobile device.

3. The system of claim 1, wherein the vehicle body controller is further programmed to receive the predefined time period from a mobile device different from the at least one mobile device.

4. The system of claim 1, wherein the vehicle body controller is further programmed to receive the predefined time period via Wi-Fi.

5. The system of claim 1, wherein the vehicle body controller is further programmed to receive the predefined time period via a connection to a remote server.

6. The system of claim 5, further comprising an embedded modem of the vehicle, wherein the vehicle body controller is further programmed to perform the connection to the remote server using the embedded modem.

7. The system of claim 1, wherein the vehicle body controller is further programmed to disable activating the power source within the cabin while the vehicle is in a plant or factory mode.

8. The system of claim 1, wherein the vehicle body controller is further programmed to:
activate the power source for a second predefined time period responsive to a subsequent activation signal; and
receive the second predefined time period from one or more of the at least one mobile device, a Wi-Fi connection, or a connection to a remote server.

9. A method comprising:
receiving, to a controller of a vehicle from a remote source, a predefined time period for activation of a power source within a cabin of the vehicle, the power source for use in charging of devices during keyoff of the vehicle;
receiving, to the controller, an input to transition the vehicle to an on or accessory mode, the vehicle configured to start with presence of a mobile device operating as a key; and
activating, by the controller, the power source for up to the predefined time period responsive to the input and a lack of detection of presence of the mobile device or any valid key.

10. The method of claim 9, wherein the remote source is the mobile device.

11. The method of claim 9, wherein the remote source is a second mobile device different from the mobile device.

12. The method of claim 9, wherein the remote source is via a Wi-Fi connection.

13. The method of claim 9, wherein the remote source is via a connection to a remote server.

14. The method of claim 13, further comprising using an embedded modem of the vehicle to perform the connection to the remote server.

15. The method of claim 9, further comprising disabling activating the power source while the vehicle is in a plant or factory mode.

16. The method of claim 9, further comprising:
activating the power source for a second predefined time period responsive to a subsequent activation signal; and
receiving the second predefined time period from one or more of the mobile device, a different mobile device, a Wi-Fi connection, or a connection to a remote server.

17. A non-transitory computer-readable medium comprising instructions that, when executed by a processor of a controller of a vehicle, cause the vehicle to perform operations including to:
receive to a controller of the vehicle, from a remote source, a predefined time period for activation of a power source within a cabin of the vehicle, the power source for use in charging of devices during keyoff of the vehicle;
receive an input to transition the vehicle to an on or accessory mode, the vehicle configured to start with presence of a mobile device operating as a key; and
activate the power source for up to the predefined time period responsive to the input and a lack of detection of presence of the mobile device or any valid key.

18. The medium of claim 17, wherein the remote source is the mobile device.

19. The medium of claim 17, wherein the remote source is a second mobile device different from the mobile device.

20. The medium of claim 17, wherein the remote source is via a Wi-Fi connection.

21. The medium of claim 17, wherein the remote source is via a connection to a remote server.

22. The medium of claim 21, further comprising instructions that, when executed by the processor of the controller of the vehicle, cause the vehicle to perform operations including to use an embedded modem of the vehicle to perform the connection to the remote server.

23. The medium of claim 17 further comprising instructions that, when executed by the processor of the controller of the vehicle, cause the vehicle to perform operations including to disable activating the power while the vehicle is in a plant or factory mode.

24. The medium of claim 17, further comprising instructions that, when executed by the processor of the controller of the vehicle, cause the vehicle to perform operations including to:
activate the power source for a second predefined time period responsive to a subsequent activation signal; and
receive the second predefined time period from one or more of the mobile device, a different mobile device, a Wi-Fi connection, or a connection to a remote server.

* * * * *